Aug. 25, 1959 — P. D. ZEMANY — 2,901,616
MASS SPECTROMETRY
Filed Aug. 19, 1954
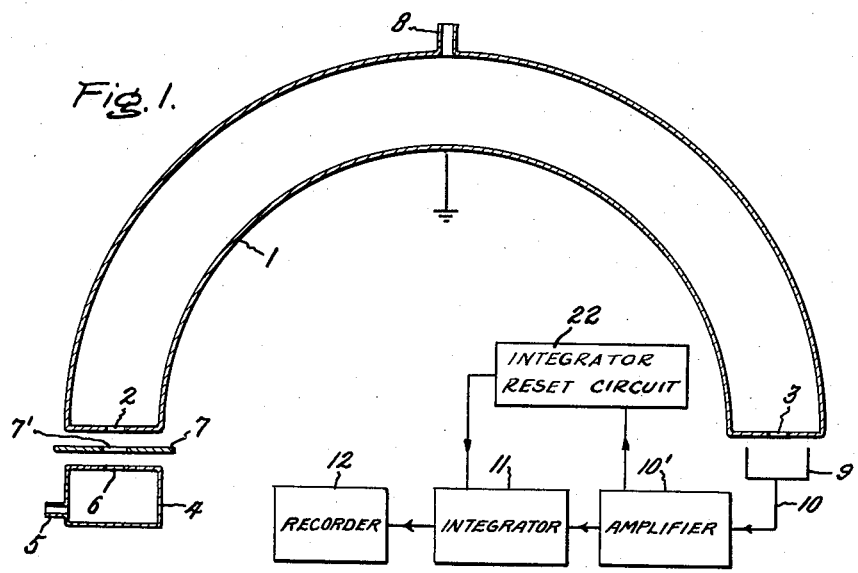
Fig. 1.
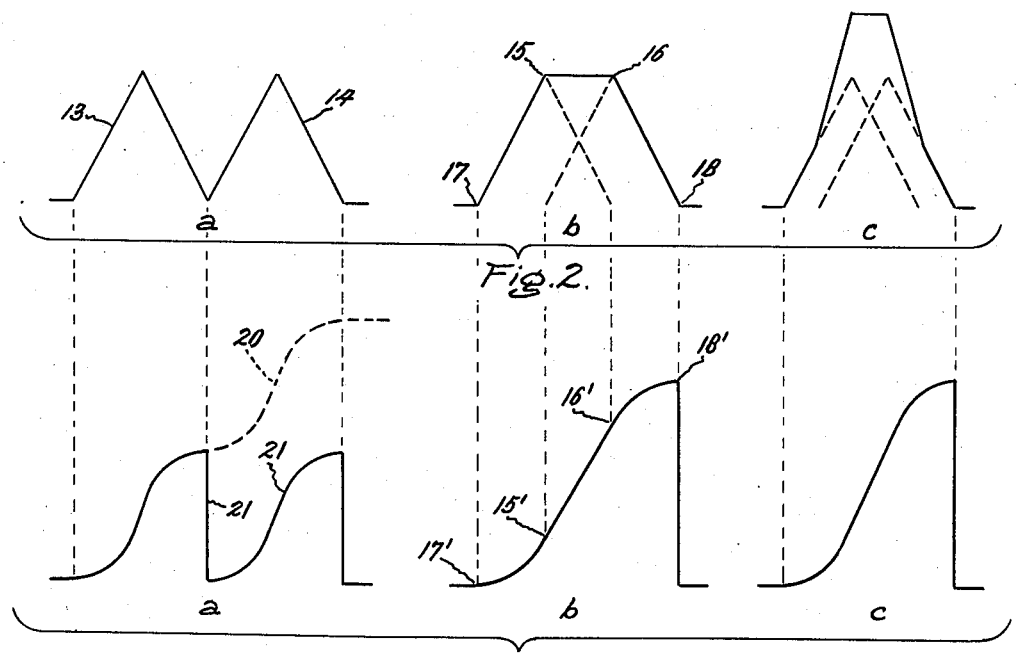
Fig. 2.
Fig. 3.
Inventor:
Paul D. Zemany,
by Paul C. Frank
His Attorney.

United States Patent Office 2,901,616
Patented Aug. 25, 1959

2,901,616

MASS SPECTROMETRY

Paul D. Zemany, Schenectady, N.Y., assignor to General Electric Company, a corporation of New York Application August 19, 1954, Serial No. 450,863

8 Claims. (Cl. 250—41.9)

My invention relates generally to mass spectrometry, and more particularly to a new and improved method and means for analyzing gaseous matter.

In one type of conventional mass spectrometer generally employed in the analysis of gaseous matter, the matter under test is ionized, and the individual ions are propelled into various divergent beams in accordance with their respective mass to charge ratios. While a collector is frequently provided which can scan these beams and remove the charge from the ions which impinge upon it, other means of scanning can be provided. The current signal appearing in the collector is converted into a voltage signal, amplified, and recorded. Since an element to be detected may be identified by its mass to charge ratio, and since a signal only appears at the collector when the beam intercepted thereby corresponds to the mass to charge ratio of an element included in the gaseous matter under test, the various ions derived from the gaseous matter under test may be detected. After detection a graph is generally constructed wherein the magnitude of the collector current is taken as the axis of ordinates and the mass to charge ratio is taken as the axis of abscissas. The horizontal positions of the vertical pulses appearing on the graph are indicative of the type of ions produced from the matter being analyzed, and the height of the pulses is indicative of the quantity of such ions. When, however, the respective mass to charge ratios of ions contained in the gaseous matter being analyzed are very nearly the same, the resolution of present mass spectrometers is insufficient to permit a distinguishing between them.

One apparent solution to this difficulty is to improve the resolution of the spectrometric equipment. However, the practical aspects of such analyzers establish a maximum limit on the degree of resolution obtainable while the degree of adjacency of the mass to charge ratio of the molecules to be distinguished may have no limit. At the present time, for example, mass spectrometers for chemical analysis are not readily available which have a sufficiently high degree of resolution to permit distinguishment between ions differing by less than one part in 3,000, and ordinarily, the limit is of the order of one part in 500.

It is, therefore, a principal object of my invention to provide a new and improved method for analyzing gaseous matter.

It is another object of my invention to provide a new and improved method for detecting and measuring ions having relatively high masses.

It is a further object of my invention to provide a mass spectrometry system for use in analyzing gaseous matter in which ions having closely related mass to charge ratios may be accurately distinguished.

In the attainment of the foregoing objects, I provide a method and means whereby the current appearing in the collector of a conventional mass spectrometer is integrated such that the areas under adjacent peaks appearing on the previously discussed graph are added together to give a true indication of the quantities of matter which are of the types having a mass to charge ratio within the boundaries of the peaks.

For further objects and advantages and for a better understanding of my invention, attention is now directed to the following description and accompanying drawing, and also to the appended claims wherein those features of novelty which characterize my invention are pointed out with particularity. In the drawing, Fig. 1 is a schematic illustration of a preferred embodiment of my invention;

Fig. 2 is a series of graphs which are helpful in understanding my invention;

Fig. 3 is a series of graphs used to further facilitate an understanding of my invention.

Referring to Fig. 1, the apparatus there illustrated includes a substantially semi-circular electrically grounded analyzer tube or vessel 1 having partially enclosed ends which are each provided therein with rectangular slits 2 and 3. An ionizing chamber 4 is provided with an inlet 5 connected to a source of gaseous matter which is to be analyzed. An opening 6 is provided in chamber 4 opposite slit 2 in analyzer 1. Since ionizing chambers are well known to those skilled in the art, and furthermore, since the ionizing chamber per se does not constitute an important part of my invention, for purposes of clarity it has been shown schematically.

An accelerating electrode 7 provided with a centrally disposed aperture 7' is interposed between opening 6 in chamber 4 and slit 2. Electrode 7 functions as the negative extremity of a direct electric field which is established between chamber 4 and electrode 7 to propel the ionized particles from the chamber into the analyzer. An electromagnet, not shown, provides an electromagnetic field which is transverse to the plane of the drawing and to the direction of motion taken by those ions travelling in this plane as they are accelerated from the ionizing chamber into the analyzer. These ions are thus caused to deviate from their normal rectilinear path into circular paths of varying radii depending upon the intensity of the magnetic field and the mass to charge ratio of the ions. When the magnetic field and the mass to charge ratio of a particular ion is such that the path taken by the ion has the same radius as analyzer tube 1, the ion so influenced passes through slit 3. However, those ions which have different mass to charge ratios do not pass through slit 3; most of them strike the walls of analyzer 1 and thereby lose their charge. An outlet 8 is provided in the wall of tube 1 for connection to an exhaust pump whereby gas may be withdrawn from the tube, which is maintained under high vacuum while in use. As is well known to the mass spectrometric art, the mass number of ions passing through slit 3 may be scanned through the mass spectrum by either varying the potential applied to accelerating electrode 7 or by varying the magnetic field within analyzer tube 2 by means well known to the art.

The ions which pass through slit 3 impinge upon a collecting electrode 9 where they are discharged. For this purpose, a Faraday cage or any other suitable collector may be employed. The current signal thus provided at collector 9 is electrically coupled through a conductor 10 to a suitable amplifier 10' and to an integrator 11. Amplifier 10' may be any of a number of well known direct current amplifier circuits suitable for amplifying small charge variations produced in the collector of a mass spectrometer. Such an amplifier may be an electrometer amplifier as shown and described on page 481 of the text, "Electron Tube Circuits" by S. Seeley, published in 1950 by the McGraw-Hill Book Company. Integrator 11 may be any commonly used and well known integrating circuit, as for example, the integrating circuit shown on page 158 of the aforementioned text, "Electron Tube Circuits." The output signal from integrator 11 is coupled to a recorder 12. Recorder 12 may conveniently be of the tape recorder type commonly used with mass spectrographs and well known to the art wherein a curve is charted on a graph having the magnitude of the signal supplied thereto taken along the axis of ordinates and time taken along the axis of abscissas.

Referring to Fig. 2, there are shown three sets of curves as might appear on a graph charted by the prior art type mass spectrometers. In curve a, a pair of adjacent peaks 13 and 14 are sufficiently separated to permit resolution of the individual peaks. For explanatory purposes, the ideal peaks have been shown, but it will be understood by those skilled in the art that the peaks actually appearing in the output of the analyzer are rounded off at the top and bottom. In curve b, a pair of adjacent peaks 15 and 16 are so closely positioned that they cannot be resolved. It then becomes desirable to determine the quantity of matter contained in the gas under test which has a mass to charge ratio between the observable limits 17 and 18 of the adjacent peaks.

To make such a quantitative analysis, it has been suggested to sum up the maximum currents in the individual peaks. As may be seen from an inspection of the special case shown in curve b, the sum so obtained will equal the height of either peak 15 or peak 16 but not the combined heights of the two. In the case of curve c, the maximum current is again not a satisfactory measure of the sum of the two peaks. This solution, therefore, fails in many instances since, except under special conditions, the peak heights so obtained are not the algebraic sum of adjacent unresolved peaks.

A modification of this solution has been to adjust the ratio of the width of the source slit to the width of the collector slit to provide flat topped peaks. Consequently, in certain special cases, the composite peak so obtained has a height equal to the sum of the heights of the unresolved adjacent peaks. In other cases this solution also fails; but in any case the difficulty is that the resolution of the analyzer is necessarily reduced.

In accordance with the teachings of my invention, the maximum resolution of the analyzer employed may be used, and coincidentally, an accurate quantitative analysis may be made. The current signal appearing in collector 9 is integrated in integrator 11 to effect a signal representative of the total area appearing under the unresolved adjacent peaks. It is thus apparent that whereas the prior art devices measure the current, and record the maximum appearing in collector 9, I totalize the charge received thereby on scanning through the adjacent peaks.

Referring to Fig. 3, there is shown a series of curves wherein the area under the peaks is taken along the axis of ordinates and the mass to charge ratio is taken along the axis of abscissas. The axis of ordinates is, therefore, dependent upon the magnitude of the charge collected. Curve a corresponds to curve a of Fig. 2, curve b corresponds to curve b of Fig. 2, and curve c corresponds to curve c of Fig. 2. In the case of resolved peaks, such, for example, as peaks 13 and 14, either the prior art method or the method described herein may be used to accurately determine the quantity of matter represented by the individual peaks. In the case of adjacent peaks 15 and 16, however, the curve of Fig. 3b gives an indication of the sum of the maximum heights of the two peaks. The points 15' through 18' in Fig. 3b correspond to positions along the ordinate as represented by the respective unprimed numerals of Fig. 2b. In the case of very closely adjacent peaks as shown in curve c of Fig. 2, the maximum current does not measure the sum of the heights of the individual peaks, and where an accurate determination is required, curve c in Fig. 3 may be employed.

In utilizing the teachings of my invention to make a chemical analysis, it is important that the spectrum be scanned at a controlled rate during the integration of the charge collected. With a known portion of the spectrum being scanned at a controlled rate and the recorder recording at a known rate the operator may readily correlate these rates to readily identify the mass-to-charge ratio of the recorded peaks. It is desirable that the integrator be returned to zero after adjacent peaks have been scanned. While this feature is not absolutely necessary, it facilitates a making of the analysis. In Fig. 3a, curve 20 is representative of the output of an integrator which is not so reset, whereas curve 21 is representative of an integrator which is reset following a sweep of adjacent peaks. The integrator may conveniently be reset manually by the operator when the leveling off of the recorded curve, for example, of curve 20 indicates that no further charges are being collected by collector 9. The circuit is then ready to begin counting anew, upon arrival of the next peak. Alternatively, an automatic reset circuit 22 may perform the same function. Thus, for instance, since the leveling off of the recorded trace indicates zero current flow in the amplifier circuit, a current responsive device, such as a holding relay, may be utilized to automatically supply a unidirectional reference voltage across the anode-to-grid capacitor in the integrating circuit and return the integrating circuit output to zero.

A counter may conveniently be employed to perform this integration. In such an embodiment, the counter is supplied with the signal from collector 9, the proper circuits being provided so that the counting rate is proportional to the signal, and when the counting rate returns to zero, which is indicative of the completion of the scan of a peak or composite peaks, the total charge collected is recorded and the counter is automatically reset to zero. This may similarly be accomplished by reset circuit 22 as described above, or manually, by the operator when the counter output ceases to increase.

When the integration has been completed as by means illustrated in Fig. 1 or by other suitable means such, for example, as by a counter, it is desirable to distinguish between the components of composite peaks. For example, carbon dioxide, $CO_2$, and propane $C_3H_8$, have peaks at an approximate mass of 44 which are difficult to resolve. While carbon dioxide does not have a peak at mass 43, propane does. From a measurement of the propane peak at mass 43, the contribution of propane to the mass 44 peak may be determined. A simple arithmetic subtraction may then be made to determine the contribution of carbon dioxide.

A similar situation occurs in an analysis of nitrogen, carbon dioxide and propane. A peak occurs at mass 28 which is difficult to resolve. Since, however, nitrogen produces no peak at masses 43 or 44, its contribution to the mass 28 peak may be readily calculated.

While my invention has been described by a particular embodiment, therefore, it will be understood that many changes and modifications may be made by those skilled in the art without departing from my invention. Therefore, by the appended claims, I intend to cover all such changes and modifications.

What I claim as new and desire to secure by Letters Patent of the United States is:

1. In a device for analyzing matter rendered gaseous in which the matter is ionized, accelerated and dispersed in different diverging beams in accordance with the charge-to-mass ratios thereof, and wherein the forces acting upon the beams are progressively changed so that ions having different charge-to-mass ratios are caused to pass through an output slit of the device at a preselected scanning rate, the combination of means for detecting the charges of ions passing through said slit, means for integrating the charge induced in said detecting means by ions passing through said slit and representing ions having closely adjacent charge-to-mass ratios which may not be resolved, to obtain the algebraic sum of the ionic charges representing said ions having closely adjacent charge-to-mass ratios and means for returning said integrating means to zero.

2. In a device for analyzing matter rendered gaseous in which the matter is ionized, accelerated and dispersed in different diverging beams in accordance with the charge-to-mass ratios thereof and wherein the forces acting upon the beams are progressively changed so that ions having different charge-to-mass ratios are caused to pass through an output slit of the device at a predetermined scanning rate, the combination of means for detecting the charges of ions passing through said slit, electronic integrating means synchronizable with said scanning rate for totalizing the charges induced in said detecting means by ions passing through said slit and representing ions having closely adjacent charge-to-mass ratios which may not be resolved to obtain the algebraic sum of the ionic charges representing said ions having closely adjacent charge-to-mass ratios and means for returning said integrating means to zero.

3. In a device for analyzing matter rendered gaseous in which the matter is ionized, accelerated and dispersed in different diverging beams in accordance with the charge-to-mass ratios thereof and wherein the forces acting upon the beams are progressively changed so that ions having different charge-to-mass ratios are caused to pass through an output slit of the device at a preselected scanning rate, the combination of means for detecting the charges of the ions passing through said slit, amplifying means responsive to said detecting means for producing a current representative of the ionic charges received by said detecting means, means for integrating said current to obtain the algebraic sum of ionic charges representing ions having closely adjacent charge-to-mass ratios which may not be resolved separately and means for returning said integrating means to zero.

4. In a device for analyzing matter rendered gaseous in which the matter is ionized, accelerated and dispersed in different diverging beams in accordance with the charge-to-mass ratios thereof and wherein the forces acting upon the beams are progressively changed so that ions having different charge-to-mass ratios are caused to pass through an output slit of the device at a preselected scanning rate, the combination of means for detecting the charges of ions passing through said slit, amplifying means responsive to said detecting means for producing a current representative of the ionic charges received by said detecting means, in which current the charges induced in said detecting means by ions having closely adjacent charge-to-mass ratios which may not be resolved are represented by overlapping peaks, means for integrating said current to obtain the algebraic sum of ionic charges representing ions having closely adjacent charge-to-mass ratios and means for returning said integrating means to zero.

5. In a device for analyzing matter rendered gaseous in which the matter is ionized, accelerated and dispersed in different diverging beams in accordance with the charge-to-mass ratios thereof, and wherein the forces acting upon the beams are progressively changed so that ions having different charge-to-mass ratios are caused to pass through an output slit of the device at a preselected scanning rate, the combination of means for detecting the charges of ions passing through said slit, means for integrating the charge induced in said detecting means by ions passing through said slit and representing ions having closely adjacent charge-to-mass ratios which may not be resolved, so as to obtain the algebraic sum of the ionic charges representing said ions having closely adjacent charge-to-mass ratios, and means for returning the integrating means to the zero reference point after said charge has been algebraically summed.

6. In a device for analyzing matter rendered gaseous in which the matter is ionized, accelerated and dispersed in different diverging beams in accordance with the charge-to-mass ratios thereof and wherein the forces acting upon the beams are progessively changed so that ions having different charge-to-mass ratios are caused to pass through an output slit of the device at a predetermined scanning rate, the combination of means for detecting the charges of ions passing through said slit, electronic integrating means synchronizeable with said scanning rate for totalizing the charges induced in said detecting means by ions passing through said slit and representing ions having closely adjacent charge-to-mass ratios which may not be resolved so as to obtain the algebraic sum of the ionic charges representing said ions having closely adjacent charge-to-mass ratios, and means for returning said electronic integrating means to the zero reference point after one said algebraic sum has been determined.

7. In a device for analyzing matter rendered gaseous in which the matter is ionized, accelerated and dispersed in different diverging beams in accordance with the charge-to-mass ratio thereof and wherein the forces acting upon the beams are progressively changed so that ions having different charge-to-mass ratios are caused to pass through an output slit of the device at a preselected scanning rate, the combination of means for detecting the charges of the ions passing through said slit, amplifying means responsive to said detecting means for producing a current representative of the ionic charges received by said detecting means as a function of charge-to-mass ratio, means for integrating said current to obtain the algebraic sum of the ionic charges representing ions having closely adjacent charge-to-mass ratios which may not be resolved separately, and means for returning said integrating means to the zero reference point after one said algebraic sum has been integrated.

8. In a device for analyzing matter rendered gaseous in which the matter is ionized, accelerated and dispersed in different diverging beams in accordance with the charge-to-mass ratios thereof and wherein the forces acting upon the beams are progressively changed so that ions having different charge-to-mass ratios are caused to pass through an output slit of the device at a preselected scanning rate, the combination of means for detecting the charges of ions passing through said slit, amplifying means responsive to said detecting means for producing a current representative of the ionic charges received by said detecting means, in which current the charges induced in said detecting means by ions having closely adjacent charge-to-mass ratios which may not be resolved are represented by overlapping peaks, means for integrating said current to obtain the algebraic sum of ionic charges representing ions having closely adjacent charge-to-mass ratios, and means for returning said integrating means to a zero reference point after one such algebraic sum has been determined.

References Cited in the file of this patent

UNITED STATES PATENTS 2,331,189    Hipple _____ Oct. 5, 1943
2,376,877    Langmuir _____ May 29, 1945

OTHER REFERENCES

Mass Spectrum Analysis by Bainbridge et al., published in Physical Review, vol. 50, August 15, 1936, pages 282–295.